US009182611B2

(12) United States Patent
Fujinaka

(10) Patent No.: US 9,182,611 B2
(45) Date of Patent: Nov. 10, 2015

(54) LENS BARREL

(71) Applicant: Panasonic Corporation, Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/170,938

(22) Filed: Feb. 3, 2014

(65) Prior Publication Data

US 2014/0146392 A1     May 29, 2014

Related U.S. Application Data

(63) Continuation of application No. PCT/JP2012/007214, filed on Nov. 9, 2012.

(30) Foreign Application Priority Data

Nov. 11, 2011    (JP) ................................. 2011-247171

(51) Int. Cl.
     *G02B 7/02*           (2006.01)
     *G02B 27/64*         (2006.01)
     *G03B 5/00*           (2006.01)

(52) U.S. Cl.
     CPC ............... *G02B 27/646* (2013.01); *G03B 5/00* (2013.01); *G03B 2205/0015* (2013.01); *G03B 2205/0069* (2013.01)

(58) Field of Classification Search
CPC .. G02B 6/3572; G02B 6/3564; G02B 6/3568; G02B 5/00; G02B 27/646
USPC ................... 359/811, 816, 824, 554
See application file for complete search history.

(56) References Cited

U.S. PATENT DOCUMENTS

| 5,689,369 | A | * | 11/1997 | Noguchi | ....................... 359/557 |
| 5,835,799 | A | * | 11/1998 | Washisu | .......................... 396/55 |
| 2005/0219718 | A1 | * | 10/2005 | Umezu et al. | ................. 359/811 |
| 2008/0219653 | A1 | * | 9/2008 | Shioda | ............................ 396/55 |

FOREIGN PATENT DOCUMENTS

| JP | H11-305280 | 11/1999 |
| JP | 2007-121556 | 5/2007 |
| JP | 2008-015159 | 1/2008 |

OTHER PUBLICATIONS

International Search Report for corresponding International Application No. PCT/JP2012/007214, mailed Feb. 19, 2013.

* cited by examiner

*Primary Examiner* — Scott J Sugarman
*Assistant Examiner* — Robert E Tallman
(74) *Attorney, Agent, or Firm* — Renner, Otto, Boisselle & Sklar, LLP

(57) ABSTRACT

A lens barrel (1) comprises an actuator (430), and an image blurring correction device (500) provided near the actuator (430). The image blurring correction device (500) has a magnetic sensor (524), a magnet (515), and a shield plate (514). The shield plate (514) comprises a main body (514*a*) that is opposite the magnet (515), and a protrusion (514*b*) that protrudes from the main body (514*a*). The main body (514*a*) is provided at a position through which pass lines of magnetic force generated from a first magnetic pole, out of the lines of magnetic force produced from the actuator (430). The protrusion (514*b*) is provided at a position through which pass lines of magnetic force generated from a second magnetic pole, out of the lines of magnetic force produced from the actuator (430).

19 Claims, 9 Drawing Sheets

LENS BARREL

CROSS-REFERENCE TO RELATED APPLICATIONS

This application claims priority to Japanese Patent Applications No. 2011-247171 filed on Nov. 11, 2011. The entire disclosure of Japanese Patent Applications No. 2011-247171 is hereby incorporated herein by reference.

BACKGROUND

The technology disclosed herein relates to a lens barrel used in an imaging device.

A lens barrel used in an imaging device comprises an image blurring correction device that corrects image blurring, and a shutter device that controls exposure time.

The image blurring correction device and the shutter device each have an actuator. The image blurring correction device has, for example, an actuator that moves a frame supporting a lens. The shutter device has an actuator that controls the opening and closing of a vane (see Patent Literature 1 (Japanese Laid-Open Patent Application 2008-15159), for example).

SUMMARY

In an effort to make an imaging device more compact, the inventor conceived of disposing the actuator of an image blurring correction device and the actuator of a shutter device closer together. However, when a plurality of actuators are disposed close together, any magnetic flux leakage from a first actuator can end up affecting a second actuator, so there is the risk of malfunction of the second actuators.

In view of this, it is an object of the technology disclosed herein to provide a lens barrel with which the magnetic flux leakage from the first actuator out of a number of actuators disposed in close proximity to each other will be less likely to affect the second actuators.

To achieve the stated object, the lens barrel pertaining to the technology disclosed herein comprises a fixed frame, a movable frame, an actuator, and an image blurring correction device. The movable frame moves relative to the fixed frame. The actuator has a first magnetic pole and a second magnetic pole. The image blurring correction device is disposed near the actuator and has a magnetic sensor, a magnet, and a shield plate. The magnetic sensor is provided for detecting the position of the movable frame. The magnet is disposed between the actuator and the magnetic sensor at a position that is opposite the magnetic sensor. The shield plate includes a main body that is provided between the actuator and the magnet and is disposed at a position that is opposite the magnet, and a protrusion that protrudes from the main body. The main body is provided at a position through which pass lines of magnetic force generated from the first magnetic pole, out of the lines of magnetic force produced from the actuator when the actuator is driven. The protrusion is provided at a position through which pass lines of magnetic force generated from the second magnetic pole, out of the lines of magnetic force produced from the actuator.

The above configuration makes it possible to provide a lens barrel with which the magnetic flux leakage from the first actuator will be less likely to affect the second actuator.

DETAILED DESCRIPTION OF THE PREFERRED EMBODIMENTS

Embodiment 1

1. Configuration of Lens Barrel

Figure 1:
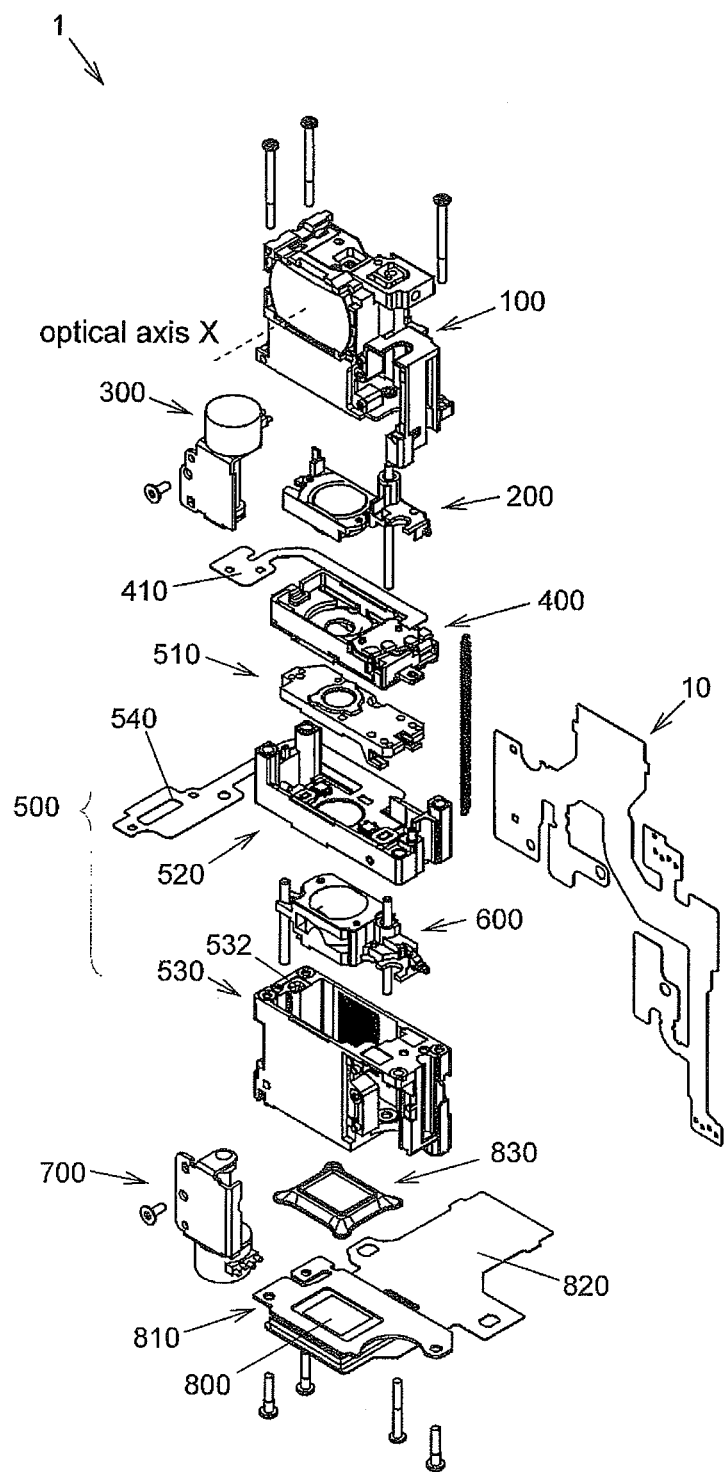
FIG. 1 is an exploded oblique view of the lens barrel pertaining to an embodiment of the present invention.

FIG. 1 is an exploded oblique view of the lens barrel 1 pertaining to Embodiment 1.

The lens barrel 1 pertaining to this embodiment comprises a first group frame 100, a second group frame 200, a zoom motor 300, a shutter device 400, an image blurring correction device 500, a fourth group frame 600, a focus motor 700, and an imaging element 800.

The lens barrel 1 forms an optical image on the imaging element 800 with an optical system made up of a plurality of optical elements provided inside the lens barrel 1.

The first group frame 100 has at least one lens constituting the optical system, and a prism (not shown) that bends a light beam 90°.

The second group frame 200 supports at least one lens constituting the optical system. The second group frame 200 is supported by the first group frame 100 so as to be capable of moving in the optical axis X direction in the space inside the first group frame 100.

The zoom motor 300 is attached to a side face of the first group frame 100. The zoom motor 300 moves the second group frame 200 installed inside the first group frame 100 in the optical axis X direction within the first group frame 100.

The shutter device 400 determines the amount of light that hits the imaging element 800 by controlling the exposure time. The shutter device 400 is attached on the imaging element 800 side of the first group frame 100.

The image blurring correction device 500 has a movable frame 510, a third group frame (frame body) 520, a fixed frame 530, and a flexible printed substrate 540. The image blurring correction device 500 corrects image blurring by moving the movable frame 510, which has a lens 511 (see FIG. 2), within a plane that is perpendicular to the optical axis X.

Figure 2:
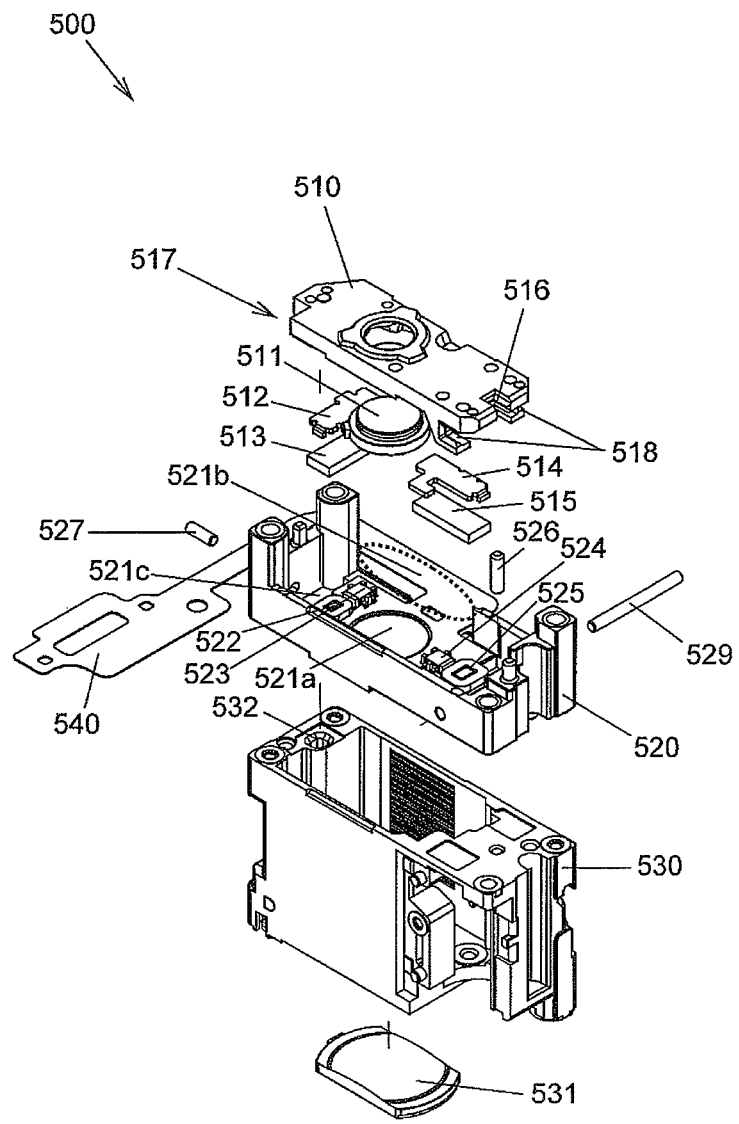
FIG. 2 is an exploded oblique view of the image blurring correction device included in the lens barrel in FIG. 1.

As shown in FIG. 2, the movable frame 510 has a magnet 513 and a magnet 515. The movable frame 510 is supported so as to be capable of moving in a planar direction perpendicular to the optical axis X with respect to the third group frame 520.

As shown in FIG. 2, the third group frame 520 has a hall element (magnetic sensor) 522, a coil 523, a hall element (magnetic sensor) 524, and a coil 525. The third group frame 520 is attached on the imaging element 800 side of the shutter device 400. The third group frame 520 is supported by the fixed frame 530.

The fixed frame 530 supports the third group frame 520. The fixed frame 530 also supports the fourth group frame 600 in an internal space in a state that allows sliding in the optical axis X direction. The focus motor 700 is attached to a side face of the fixed frame 530. The imaging element 800 is attached to the fixed frame 530 via a blocking member 830 and a metal plate 810.

The flexible printed substrate 540 is electrically connected to the hall element 522, the coil 523, the hall element 524, and the coil 525. The third group frame flexible printed substrate 540 is also electrically connected to a flexible printed substrate 10 of the lens barrel 1.

The image blurring correction device 500 will be described in detail at a later point.

The fourth group frame 600 supports a focusing lens. The fourth group frame 600 is driven by the focus motor 700 in the optical axis X direction within the fixed frame 530.

The focus motor 700 is attached to a side face of the fixed frame 530. The focus motor 700 adjusts the focal point by driving the fourth group frame 600 in the optical axis X direction.

The imaging element 800 is adhesively fixed to the metal plate 810.

The metal plate 810 is fixed to the fixed frame 530 so as to sandwich the blocking member 830 in between. The imaging element 800 is electrically connected to a flexible printed substrate 820.

The lens barrel 1 in this embodiment is configured as above, and an optical system is constituted by fixing the first group frame 100, the shutter device 400, the image blurring correction device 500, and the imaging element 800 in a state of being stacked in the optical axis direction.

The flexible printed substrate 10 is wound around and fixed to the lens barrel 1. The flexible printed substrate 10, a flexible printed substrate 410, and the fixed frame 530 are connected to a terminal of the flexible printed substrate 820, so that the zoom motor 300, the shutter device 400, the image blurring correction device 500, the focus motor 700, and the imaging element 800 are connected to a control circuit.

The lens barrel 1 drives the zoom motor 300 and changes the position of the second group frame 200, thereby changing the focal distance of the optical system and allowing zoom operation. Focusing can be accomplished by driving the focus motor 700 and changing the position of the fourth group frame 600 according to the position of the second group frame 200 and the distance of the subject. In the event that the entire camera vibrates and image blurring occurs, this blurring can be suppressed by controlling the position of the movable frame 510 so that the blurring is cancelled out.

2. Configuration of Image Blurring Correction Device

Figure 3:
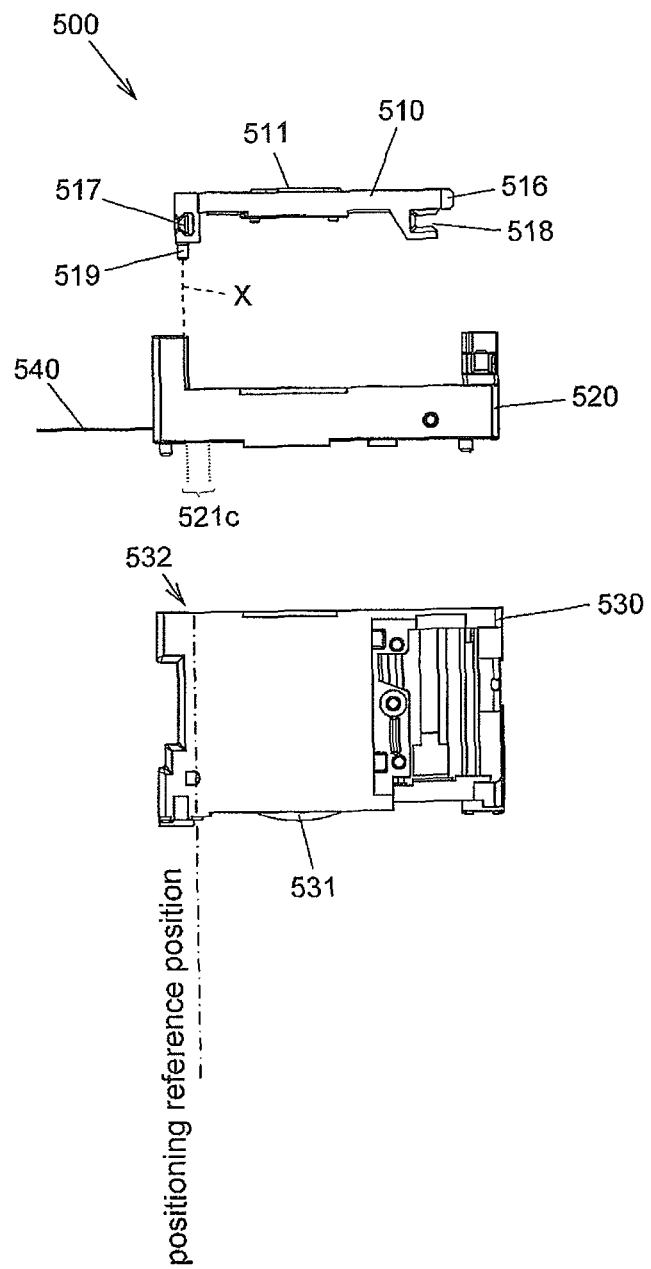
FIG. 3 is a side view of the image blurring correction device in FIG. 2.

The configuration of the image blurring correction device 500 will now be described in detail. FIG. 2 is an exploded oblique view of the image blurring correction device 500 pertaining to this embodiment. FIG. 3 is a side view of the image blurring correction device 500 pertaining to this embodiment.

As shown in FIG. 2, the image blurring correction device 500 comprises the movable frame 510, the third group frame 520, the fixed frame 530, and the flexible printed substrate 540.

The movable frame 510 has the lens 511, a shield plate 512, the magnet 513, the shield plate 514, and the magnet 515.

The lens 511 is used for correcting image blurring, and is supported by the movable frame 510.

The shield plate 512 is provided in order to shield the magnet 513 from magnetism. The shield plate 512 is disposed between the movable frame 510 and the magnet 513, and is adhesively bonded to the movable frame 510.

The magnet 513 is a magnet constituting an actuator for rotationally moving the movable frame 510, and is adhesively bonded to the shield plate 512.

The shield plate 514 is provided in order to shield the magnet 515 and a shutter actuator 430 from magnetism. The shield plate 514 is disposed between the movable frame 510 and the magnet 515, and is adhesively bonded to the movable frame 510 at the portion of a protrusion 514b (discussed below; see FIG. 5).

The magnet 515 is a magnet constituting an actuator that translationally moves the movable frame 510, and is magnetically chucked to the shield plate 514. The magnet 515 is nickel plated to rustproof the surface. Therefore, the magnet 515 does not lend itself to bonding to the movable frame 510 with an adhesive or the like. In view of this, in this embodiment the magnet 515 is magnetically chucked to the iron shield plate 514, and the shield plate 514 is adhesively bonded to the movable frame 510, so that the magnet 515 is also fixed indirectly to the movable frame 510.

A U groove 516, a U groove 517, and a U groove 518 are formed in the movable frame 510.

The U groove 516, the U groove 517, and the U groove 518 are cut-outs that are substantially U-shaped in cross sectional view. The U groove 516, the U groove 517, and the U groove 518 are respectively engaged with a slide shaft 526, a slide shaft 527, and a slide shaft 528 (discussed below).

Engaging the U groove 516 with the slide shaft 526 makes possible the translational movement of the movable frame 510 and the rotational movement of the movable frame 510 around the slide shaft 526.

Engaging the U groove 517 with the slide shaft 527 restricts movement of the movable frame 510 in the optical axis X direction.

Engaging the U groove 518 with the slide shaft 528 restricts movement of the movable frame 510 in the optical axis X direction and inclination of the movable frame 510.

As shown in FIG. 3, the movable frame 510 also has a protrusion 519 that extends from a face of the movable frame 510 on the imaging element 800 side in the optical axis X direction. The protrusion 519 is inserted into a hole 532 formed in the fixed frame 530, in a state of having passed through a through-hole 521c formed in the third group frame 520. This restricts the range of movement of the movable frame 510 in a plane that is perpendicular to the optical axis X.

An opening 521a is formed in the third group frame 520 at a position opposite the lens 511. An opening 521b is formed in a side wall of the third group frame 520.

The opening 521b allows the movable frame 510 to be assembled to the third group frame 520 from a direction perpendicular to the optical axis X even when the slide shafts 526, 527, and 528 have been fixed to the third group frame 520.

A wall portion 461 (see FIG. 4) that extends in the optical axis X direction is formed on the side wall of the shutter device 400 at a position corresponding to the opening 521b of the third group frame 520. Consequently, when the shutter device 400 and the third group frame 520 are stacked and fixed in the optical axis X direction, no opening is formed in the side wall of the image blurring correction device 500.

The through-hole 521c is formed in the third group frame 520 so that the third group frame 520 and the movable frame 510 will not interfere with each other during movement of the movable frame 510 and during assembly of the movable frame 510 and the third group frame 520. The through-hole 521c allows the protrusion 519 to be inserted into the hole 532 via the third group frame 520. Consequently, the fixed frame 530 supports the movable frame 510 indirectly via the third group frame 520.

As shown in FIG. 2, the third group frame 520 has the hall element 522, the coil 523, the hall element 524, and the coil 525.

The hall element 522 is adhesively bonded to the third group frame 520 in parallel with the coil 523 in order to detect the amount of rotational movement of the movable frame 510.

The coil 523 constitutes an actuator for rotationally moving the movable frame 510. The coil 523 is adhesively bonded to the third group frame 520 at a position opposite the magnet 513.

The hall element 524 is adhesively bonded to the third group frame 520 in parallel with the coil 525 in order to detect the amount of translational movement of the movable frame 510.

The coil 525 constitutes an actuator for translationally moving the movable frame 510. The coil 525 is adhesively bonded to the third group frame 520 at a position opposite the magnet 515.

The third group frame 520 has the slide shaft 526, the slide shaft 527, and the slide shaft 528. As discussed above, the slide shaft 526, the slide shaft 527, and the slide shaft 528 are respectively engaged with the U groove 516, the U groove 517, and the U groove 518.

The movable frame 510 is supported on the third group frame 520 so as to be capable of moving in a plane that is perpendicular to the optical axis X by engaging the U groove 517 and the U groove 518 with the slide shaft 527 and the slide shaft 528, respectively. The movable frame 510 is also supported so as to be capable of sliding and of rotating around the slide shaft 526 by engaging the U groove 516 with the slide shaft 526.

The fixed frame 530 has an opening formed along the optical axis X direction, and a lens 531 provided to an opening on the imaging element 800 side. The fixed frame 530 supports the third group frame 520 at the end face on the subject side. The fixed frame 530 also has the hole 532, which is recessed in the optical axis X direction, in the end face on the subject side.

When the movable frame 510, the third group frame 520, and the fixed frame 530 are stacked in the optical axis X direction and fixed, the protrusion 519 of the movable frame 510 is inserted into the hole 532 in the fixed frame 530.

The hole 532 is formed as a substantially square hole in plan view, and is provided near a positioning reference position at the end face on the subject side of the fixed frame 530. The "positioning reference position" here means a position that serves as a reference position for positioning in the setting of the center position in two directions perpendicular to the optical axis direction, on the basis of the output of the hall element 522 and 524 when the protrusion 519 is moved to an opposing second wall face from a state in which the protrusion 519 is in contact with a first wall face of the substantially square hole 532, in a state in which the protrusion 519 on the movable frame 510 side has been inserted into the hole 532 on the fixed frame 530 side in the attachment of the movable frame 510 to the fixed frame 530, and when the protrusion 519 is similarly moved between a third wall face and an opposing fourth wall face in a perpendicular direction.

As shown in FIG. 3, in this embodiment the positioning reference position at which the hole 532 is formed is near the end on the left side in the drawing.

The size of the substantially square hole 532 is greater than the diameter of the protrusion 519. Therefore, the movable frame 510 can move within the clearance that exists between the inner peripheral face of the hole 532 and the outer peripheral face of the protrusion 519. Consequently, when the protrusion 519 is inserted into the hole 532, movement of the movable frame 510 within a plane perpendicular to the optical axis X is restricted to a specific range, and the above-mentioned positioning can be carried out.

The above configuration provides an image blurring correction device 500 with improved relative positional precision between lenses.

In general, the performance of an optical system is highest when the optical axes of lenses are completely coaxial. On the other hand, the performance of an optical system decreases as these axes deviate from a coaxial state.

Because the above-mentioned configuration of the image blurring correction device 500 in this embodiment improves the positional precision between lenses, deterioration of the designed optical performance can be reduced. Accordingly, use of the image blurring correction device 500 provides a lens barrel 1 with high average performance, including variance.

Furthermore, the following useful effect is obtained with the image blurring correction device 500 of this embodiment.

Specifically, the image blurring correction device 500 has fewer parts, so it is easier to assemble.

When movement of the movable frame 510 is restricted by the third group frame 520, for the U grooves and slide shafts to be engaged, it is generally necessary to attach other members after the slide shafts have been engaged with the U grooves. Alternatively, the slide shafts have to be inserted after assembling the movable frame 510 and the third group frame 520.

In contrast, the image blurring correction device 500 in this embodiment, the protrusion 519 formed on the movable frame 510 is inserted into the hole 532 formed in the fixed frame 530.

This means that movement of the movable frame 510 in a plane perpendicular to the optical axis X is kept to a minimum, so no separate member is needed.

Also, the opening 521b is formed in the side wall of the third group frame 520. Therefore, even when the slide shafts 526, 527, and 528 have been fixed to the third group frame 520, it will still be possible to attach the movable frame 510 to the third group frame 520 from a direction that is perpendicular to the optical axis X. Thus, the image blurring correction device 500 is easier to assemble.

Also, deterioration of the performance of the image blurring correction device 500 can be reduced.

Specifically, with a method in which a separate member is added to restrict movement of the movable frame 510, there is the risk that looseness, deformation, or the like will occur when the separate member is fixed to the movable frame 510 and the third group frame 520, which would cause performance to suffer.

Also, with a method in which the slide shafts are inserted in later, a drop in performance could be caused by problems such as scratching of the U grooves in the insertion of the slide shafts.

In contrast, with the image blurring correction device 500 in this embodiment, the protrusion 519, which is formed integrally with the movable frame 510, is inserted into the hole 532 to restrict movement of the movable frame 510 in a plane perpendicular to the optical axis X.

This means that there is no need to attach a separate member in later with the image blurring correction device 500.

Also, the opening 521b is formed in the side wall of the third group frame 520.

Consequently, even when the slide shafts 526, 527, and 528 have been fixed to the third group frame 520, it will still be possible to attach the movable frame 510 to the third group frame 520 from a direction that is perpendicular to the optical axis X. That is, the image blurring correction device 500 does not require the slide shafts to be inserted in later. Thus, deterioration in the performance of the image blurring correction device 500 during assembly can be avoided more effectively than in the past.

An example of the image blurring correction device 500 was described above in which the movable frame 510 had the protrusion 519, and the fixed frame 530 had the hole 532, but the present invention is not limited to this.

For example, the image blurring correction device 500 may be such that the fixed frame 530 has a protrusion that extends in the optical axis direction, and the movable frame 510 has a hole into which this protrusion is inserted. Here again, inserting the protrusion into the hole restricts movement of the movable frame 510 to within a specific range.

Also, an example of the image blurring correction device 500 was described above in which the movable frame 510 was supported indirectly by the fixed frame 530 via the third group frame 520, but the present invention is not limited to this.

For example, the image blurring correction device 500 may be such that the slide shafts and so forth are fixed to the fixed frame 530, and the fixed frame 530 directly supports the movable frame 510.

Also, the image blurring correction device 500, the third group frame 520, and the fixed frame 530 may be formed integrally, for example.

3. Configuration of Shutter Device

Figure 4:
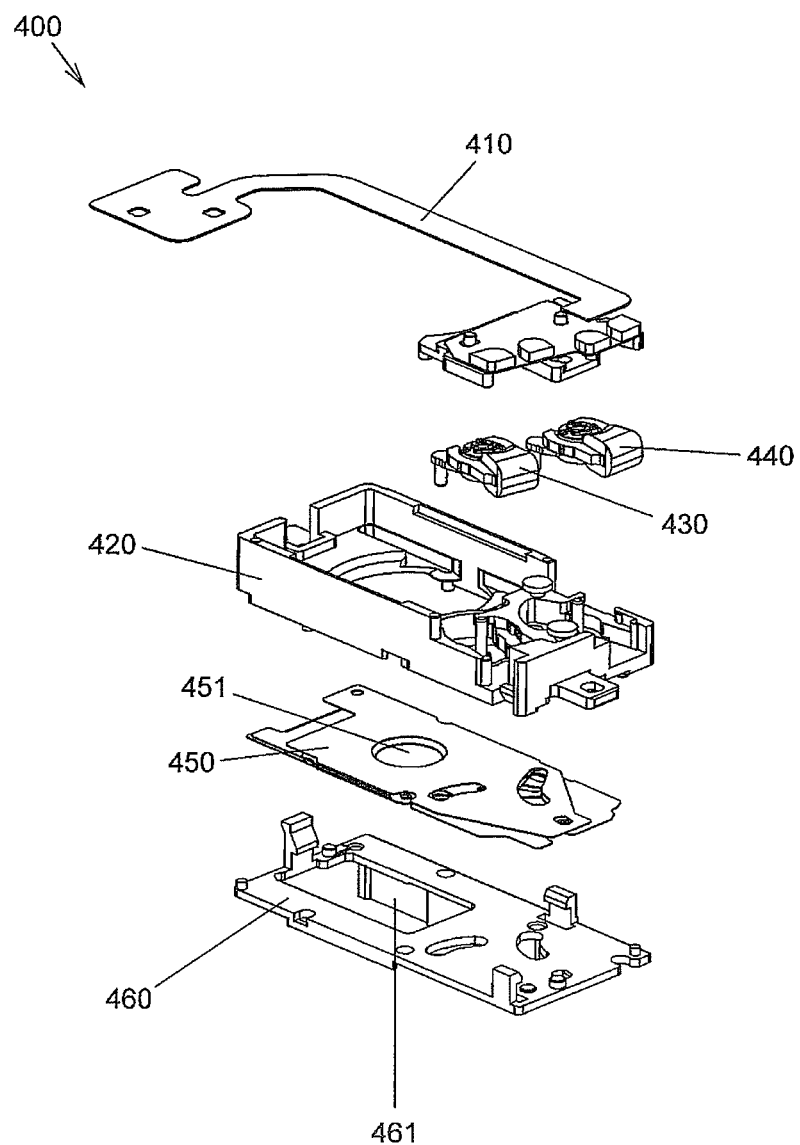
FIG. 4 is an exploded oblique view of the shutter device included in the lens barrel in FIG. 1.

The configuration of the shutter device 400 will now be described in detail. FIG. 4 is an exploded oblique view of the shutter device 400 in this embodiment.

As shown in FIG. 4, the shutter device 400 comprises the flexible printed substrate 410, a main body frame 420, a shutter actuator 430, an ND actuator 440, a vane 450, and a vane fixing frame 460.

The flexible printed substrate 410 is electrically connected to the shutter actuator 430 and the ND actuator 440. The flexible printed substrate 410 is also electrically connected to a terminal on the flexible printed substrate 10 of the lens barrel 1.

Consequently, the shutter actuator 430 and the ND actuator 440 are electrically connected to a control circuit.

The main body frame 420 is attached on the imaging element 800 side of the first group frame 100. The main body frame 420 has a frame-shape and supports the shutter actuator 430 and the ND actuator 440 in its interior. The main body frame 420 supports the vane 450 on the imaging element 800 side. The vane fixing frame 460 is attached to the main body frame 420 so as to sandwich the vane 450 in between.

The shutter actuator 430 controls the opening and closing of an opening 451 in the vane 450.

The ND actuator 440 inserts and retracts a filter (not shown), which suppresses the transmissivity of light, into and out of the opening 451 of the vane 450.

The ND actuator 440 and the shutter actuator 430 in this embodiment are electromagnetic actuators. The shutter actuator 430 has a yoke 431, a coil 432, and a magnet 433 (see FIG. 6A). The ND actuator 440 also has a yoke, coil, and magnet (not shown).

The vane 450 has the opening 451, and the opening and closing of the opening 451 is controlled by the shutter actuator 430.

The vane fixing frame 460 is attached to the main body frame 420 with the vane 450 in between, which fixes the vane 450 to the main body frame 420.

4. Relation Between Shutter Device and Image Blurring Correction Device

The relation between the structure of the shutter device 400 and the structure of the image blurring correction device 500 will now be described in detail.

The image blurring correction device 500 has an electromagnetic actuator made up of the magnet 513 and the coil 523 or the magnet 515 and the coil 525.

The shutter device 400 also has the shutter actuator 430 and the ND actuator 440, which are electromagnetic actuators.

Therefore, when the shutter device 400 and the image blurring correction device 500 are disposed close to each other, magnetic flux leakage from a first actuator can affect a second actuator, so there is the risk of malfunction in the actuator operation.

For example, with the configuration in this embodiment, it was found that magnetic flux leakage when power is sent to the coil 432 of the shutter actuator 430 affects the hall element 524 of the image blurring correction device 500.

Consequently, there is the risk that the hall element 524 will not detect the position of the movable frame 510 as accurately.

It was also found that the magnetic flux of the magnet 515 in the image blurring correction device 500 affects the shutter actuator 430.

Consequently, there is the risk that operation of the shutter actuator 430 will be adversely affected.

It was alternatively found that an attractive force is generated between the magnet 515 and the yoke 431 or magnet 433 of the shutter actuator 430 in the image blurring correction device 500.

Consequently, there is the risk that an increase in frictional force between parts will cause problems such as difficulty in the operation of the image blurring correction device 500 and the shutter actuator 430.

Figure 5:
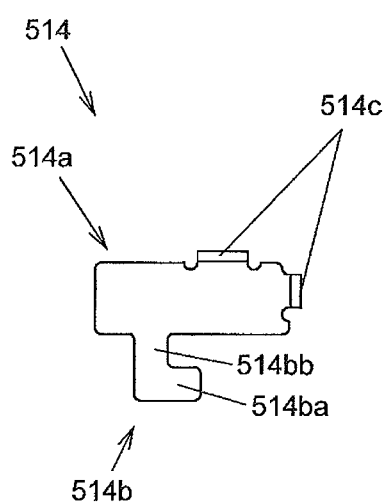
FIG. 5 shows the positional relation between the shield plate and the actuator included in the lens barrel in FIG. 1.

In view of this, in this embodiment the shield plate 514 has a characteristic shape. FIG. 5 is a top view of the shield plate 514 in this embodiment.

The shield plate 514 has a main body 514a, a protrusion 514b, and a protrusion 514c.

The main body 514a has a substantially square shape the same as the magnet 515, and is adhesively bonded at a position opposite the magnet 515.

The protrusion 514b protrudes from the main body 514a to the shutter actuator 430 side. As shown in FIG. 5, the protrusion 514b has a magnetic flux absorption portion 514ba and a linking portion 514bb.

The magnetic flux absorption portion 514ba is disposed at a position opposite the shutter actuator 430, and absorbs the magnetic flux generated from a second magnetic pole 430b (see FIG. 7C) of the shutter actuator 430.

The linking portion 514bb links the main body 514a and the magnetic flux absorption portion 514ba, and its surface area is smaller than that of the main body 514a and the protrusion magnetic flux absorption portion 514ba.

The protrusion 514c is provided in order to position the magnet 515 in the attachment of the magnet 515 to the movable frame 510.

Figure 6A:
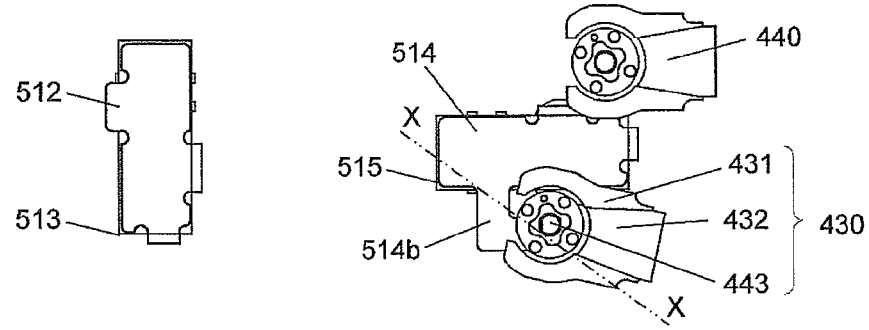
FIGS. 6A to 6C are top view, side view and rear view of the shield plate included in the lens barrel in FIG. 1.
Figure 6B:
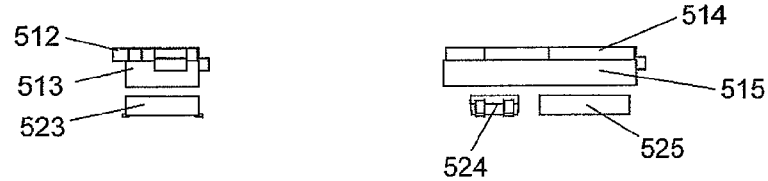
Figure 6C:
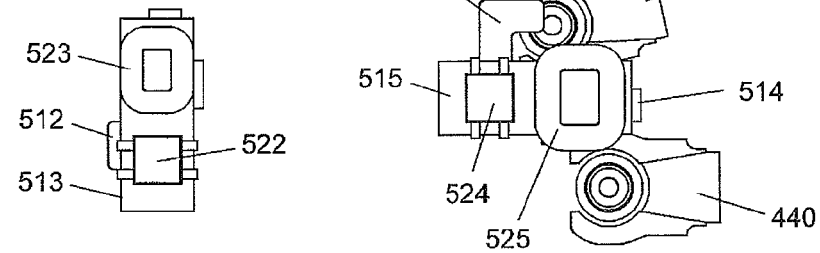

Next, the positional relation between the shutter actuator 430 and the shield plate 512 will be described. FIGS. 6A to 6C show the positional relation between the shutter actuator 430 and the shield plate 512 in this embodiment. FIG. 6A is a top view, FIG. 6B is a front view, and FIG. 6C is a bottom view.

First, the shutter actuator 430 has a horseshoe-shaped yoke 431, a coil 432 that is wound around the yoke 431, and a substantially cylindrical magnet 433.

Although not described here, in this embodiment the ND actuator 440 is configured the same as the shutter actuator 430.

The shield plate 514 has, in addition to the main body 514a that is opposite the magnet 515, the protrusion 514b that protrudes intentionally from the main body 514a. This protrusion 514b is provided at a position opposite the shutter actuator 430.

That is, the main body 514a is provided at a position through which pass the lines of magnetic force generated from a first magnetic pole 430a, out of the lines of magnetic force produced from the shutter actuator 430. The protrusion 514b is provided at a position through which pass the lines of magnetic force generated from the second magnetic pole 430b, out of the lines of magnetic force produced from the shutter actuator 430.

As discussed above, the image blurring correction device 500 has the hall element 524, which detects the position of the movable frame 510, and the magnet 515 and the coil 525 that drive the movable frame 510.

The magnet 515 is disposed between the shutter actuator 430 and the hall element 524, opposite the hall element 524.

The image blurring correction device 500 further has the shield plate 514 for shielding the magnet 515 and the shutter actuator 430 from magnetism.

The shield plate 514 is provided between the shutter actuator 430 and the magnet 515. The shield plate 514 absorbs the magnetic flux generated from the magnet 515. In particular, it is the role of the main body 514a of the shield plate 514 to reduce magnetic flux leakage that occurs on the shutter actuator 430 side of the magnet 515.

Thus, the main body 514a reduces magnetic flux leakage that occurs on the shutter actuator 430 side of the magnet 515.

Consequently, the main body 514a can keep the magnetic flux of the magnet 515 from diminishing the operation of the shutter actuator 430, which happens when the magnetic flux of the magnet 515 works its way around the shutter actuator 430.

Also, the main body 514a suppresses the attractive force generated between the magnet 515 and the yoke 431. The main body 514a also suppresses the attractive force generated between the magnet 515 and the magnet 433.

Also, it is the role of the main body 514a to reduce magnetic resistance around the magnet 515. Thus, even if the magnet 515 is made thinner, the same magnetic flux will be obtained as when no main body 514a is provided. In recent years, the price of neodymium (Nd), dysprosium (Dy), and other such rare earth metals used in permanent magnets has been on the rise, and this has driven up material costs. Therefore, the magnet 515 can be made thinner by providing the main body 514a, and as a result, the amount of magnet material used for the magnet 515 is reduced, and the material costs are lower.

As discussed above, providing part of the shield plate 514 (the main body 514a) so as to be opposite the magnet 515 reduces the effect that magnetic flux leakage from the magnet 515 has on the shutter device 400.

However, the main body 514a is insufficient as a way to deal with the effect that magnetic flux leakage of the shutter device 400 has on the image blurring correction device 500.

In this embodiment, as shown in FIG. 3, this is dealt with by using the shield plate 514, which has, in addition to the main body 514a that is opposite the magnet 515, the protrusion 514b that protrudes intentionally from the main body 514a.

The effect of providing the protrusion 514b to the shield plate 514 will now be described in detail.

Figure 7A:
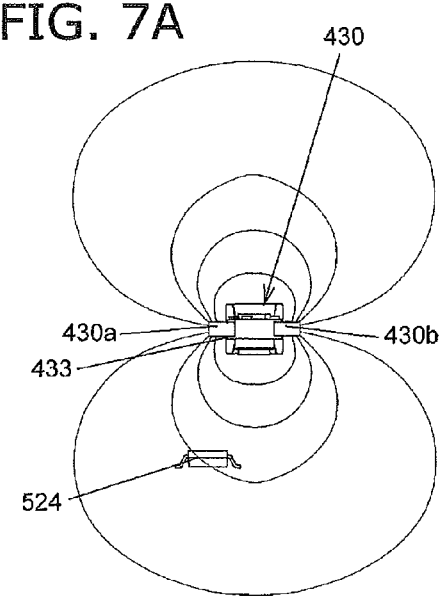
FIGS. 7A to 7C show the action relation between the shield plate and the actuator included in the lens barrel in FIG. 1.
Figure 7B:
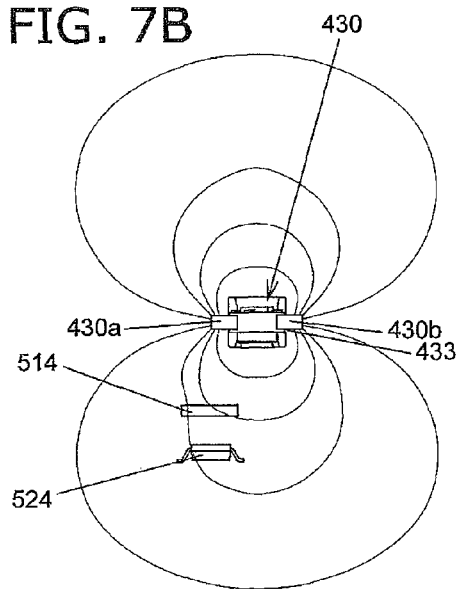
Figure 7C:
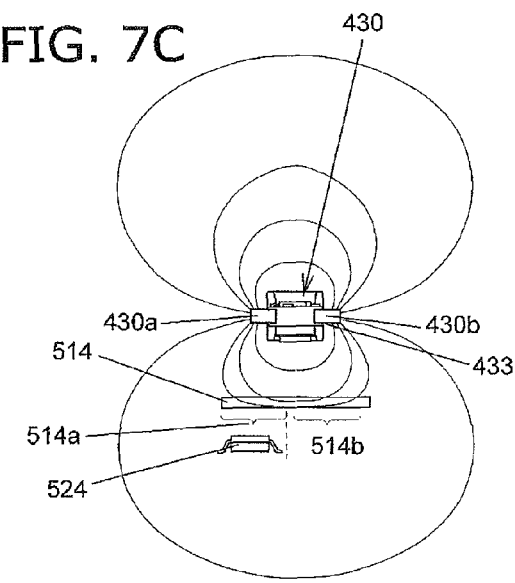

FIGS. 7A to 7C show the positional relation between the shield plate 514 and the shutter actuator 430 in this embodiment. FIG. 7A shows the lines of magnetic force when no shield plate 514 is provided, FIG. 7B when there is no protrusion 514b of the shield plate 514, and FIG. 7C when there is a protrusion 514b of the shield plate 514. FIG. 7C is a cross section along the X-X line in FIG. 6A.

The lines shown in FIGS. 7A to 7C are the lines of magnetic force generated from the shutter actuator 430. As shown in FIGS. 7A to 7C, the magnetic flux generated from the shutter actuator 430 is generated from a first side of the horseshoe-shaped yoke 431 (the first magnetic pole 430a) and returns to a second side (the second magnetic pole 430b).

The inventors used magnetic field analysis software to calculate the magnetic flux density acting on the hall element 524 in the three scenarios shown in FIGS. 7A to 7C. These results are given below.

In the case of FIG. 7A, the magnetic flux density acting on the hall element 524 was 3.10 gauss. With FIG. 7B, the magnetic flux density acting on the hall element 524 was 4.59 gauss. With FIG. 7C, the magnetic flux density acting on the hall element 524 was 2.43 gauss.

It was found that the magnetic flux density acting on the hall element 524 was higher in the case of FIG. 7B than FIG. 7A. That is, it was found that when the main body 514a is merely provided to the magnet 515, the leaked magnetic flux acting on the hall element 524 is higher than when the shield plate 514 is not provided.

The reason for this seems to be that the shield plate 514 short-circuits the magnetic path, or collects the surrounding magnetic flux.

The shield plate 514 is made from a material with low magnetic resistance. Therefore, when the shield plate 514 is disposed near one side of the shutter actuator 430, the shield plate 514 either short-circuits the magnetic path or collects the surrounding magnetic flux. This seems to be what increases the leaked magnetic flux acting on the hall element 524.

Meanwhile, it was found that in the case of FIG. 7C the magnetic flux density acting on the hall element 524 is lower. With FIG. 7C, the protrusion 514b of the shield plate 514 extends not only close to a first side of the shutter actuator 430 (the first magnetic pole 430a), but also to a second side (the second magnetic pole 430b). Therefore, the lines of magnetic force emitted from the first side of the shutter actuator 430 (the first magnetic pole 430a) go into the protrusion 514b, pass through the main body 514a, and return to the second side of the shutter actuator 430 (the second magnetic pole 430b). This is believed to be why the leaked magnetic flux acting on the hall element 524 is smaller.

Thus, just as in this embodiment, to lower the magnetic flux density acting on the hall element 524, it is necessary to provide the shield plate 514 to both sides of the lines of magnetic force produced from the shutter actuator 430.

That is, the shield plate 514 should be provided so as to cover both the position through which pass the lines of magnetic force generated from the first magnetic pole 430a, out of the lines of magnetic force produced from the shutter actuator 430, and the position through which pass the lines of magnetic force generated from the second magnetic pole 430b, out of the lines of magnetic force produced from the shutter actuator 430.

However, if an attempt is made to make the lens barrel 1 more compact, there will be few positions available to dispose the shutter actuator 430 and the magnet 515 of the image blurring correction device 500. Accordingly, if the shield plate 514 is merely disposed at just a position opposite the magnet 515, there will be many cases when a sufficient effect cannot be anticipated.

In view of this, the shield plate 514 has, in addition to the main body 514a that is opposite the magnet 515, the protrusion 514b that protrudes intentionally from the main body 514a.

As shown in FIG. 7C, the main body 514a is provided at a position through which pass the lines of magnetic force generated from the first magnetic pole 430a, out of the lines of magnetic force produced from the shutter actuator 430.

As shown in FIG. 7C, the protrusion 514b is provided at a position through which pass the lines of magnetic force generated from the second magnetic pole 430b, out of the lines of magnetic force produced from the shutter actuator 430.

Consequently, the effect that magnetic flux leakage from the magnet 515 has on the shutter device 400, and the effect that magnetic flux leakage from the shutter device 400 has on the image blurring correction device 500 can be effectively suppressed.

Therefore, with the lens barrel 1 in this embodiment, even when a configuration is employed in which a plurality of actuators are disposed close together, it will be less likely that magnetic flux leakage generated by the first actuator will affect the second actuators.

It is also possible to increase the surface area of the protrusion 514b and give it a shape that covers the entire shutter actuator 430. In this case, it is believed that the leaked magnetic flux acting on the hall element 524 will be further reduced.

However, if the protrusion 514b is made too large, then the mass of the movable frame 510 including the shield plate 514 will end up increasing. This could lead to diminished performance of the image blurring correction device 500. Also, the shield plate 514 ends up being larger in size. Therefore, it is believed that this will lead to an increase in the size of the lens barrel 1.

The inventors of the present invention discovered that even if the protrusion 514b has a smaller surface area than the main body 514a, an adequate effect can be obtained by providing the protrusion 514b at a position through which pass the lines of magnetic force on the opposite side from the lines of magnetic force passing through the main body 514a side.

The shape and size of the protrusion 514b are preferably determined by taking into account the magnetic flux leakage reduction effect.

In this embodiment, a so-called magnet movable type of configuration was described as an example, in which the magnet 513, the magnet 515, the shield plate 512, and the shield plate 514 are provided on the movable frame 510 side, and the hall element 522, the hall element 524, the coil 523, and the coil 525 are provided on the third group frame 520 side. However, the present invention is not limited to this.

For example, although not depicted in the drawings, a so-called coil movable configuration may be employed, which is antipole to the magnet movable type. That is, the hall element 522, the hall element 524, the coil 523, and the coil 525 may be provided to the movable frame 510, and the magnet 513, the magnet 515, the shield plate 512, and the shield plate 514 may be provided to the third group frame 520.

As discussed above, with the lens barrel 1 in this embodiment, the shield plate 514 includes the main body 514a that is opposite the magnet 515, and the protrusion 514b that protrudes from the main body 514a. The main body 514a is provided at a position through which pass the lines of magnetic force generated from the first magnetic pole 430a, out of the lines of magnetic force produced from the shutter actuator 430, by driving the shutter actuator 430. Also, the protrusion 514b is provided at a position through which pass the lines of magnetic force generated from the second magnetic pole 430b, out of the lines of magnetic force produced from the shutter actuator 430.

Consequently, the effect of magnetic flux leakage from the magnet 515 on the shutter device 400, and the effect of magnetic flux leakage from the shutter device 400 on the image blurring correction device 500 can be suppressed.

Therefore, with the lens barrel 1 in this embodiment, even when a plurality of actuators are disposed close together, magnetic flux leakage generated from the first actuator (the shutter actuator 430) will not affect the second actuators as much.

In this embodiment, the configuration around the shutter actuator 430 was described, but the same configuration can also be applied around the ND actuator 440.

However, an ND mechanism is rarely actuated at the instant an image is captured by a camera, and it is more effective to employ this configuration on the shutter mechanism side than an ND mechanism.

Besides the above, this configuration can also be applied between an image stabilization mechanism and an actuator used for lens drive.

5. Configuration of Blocking Member

The configuration of the blocking member 830, which blocks the gap between the imaging element 800 and the fixed frame 530, will now be described.

FIGS. 8A to 8E show the shape of the blocking member 830 in this embodiment, and are respectively a top view, a side view, a front view, an A-A cross section, and a B-B cross section.

Figure 9A:
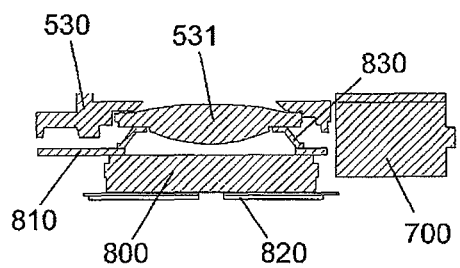
FIGS. 9A and 9B are detail cross sections of the lens barrel, showing the area around the blocking member in FIGS. 8A to 8E.
Figure 9B:
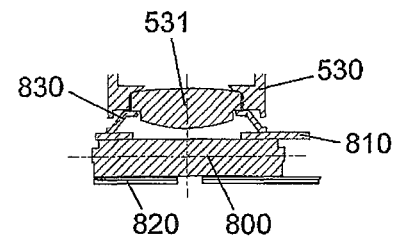

FIGS. 9A and 9B are detail cross sections of the lens barrel 1, showing the configuration around the blocking member 830 in this embodiment, and are respectively a cross section as seen from the front and a cross section as seen from the side.

Figure 8A:
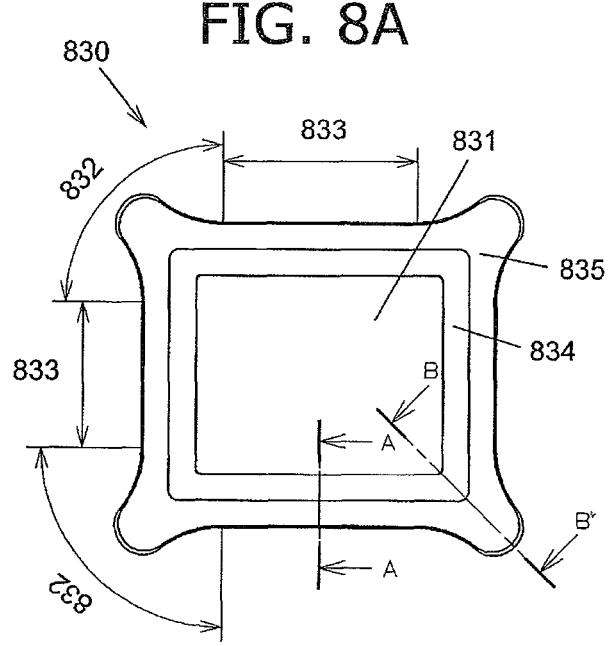
FIGS. 8A to 8E show the shape of a blocking member included in the lens barrel in FIG. 1.
Figure 8B:
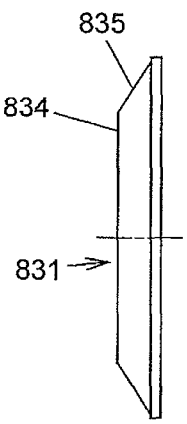
Figure 8C:
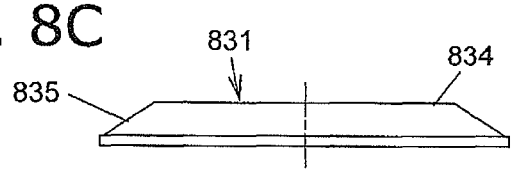
Figure 8D:
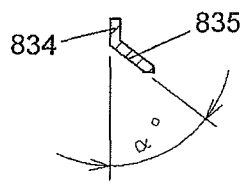
Figure 8E:
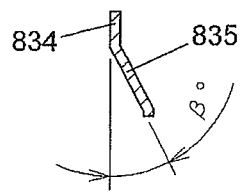

As shown in FIG. 8A, the blocking member 830 has an opening 831 that opens at a position opposite the imaging element 800. The blocking member 830 has, around its outer peripheral portion, a top part 832 whose four corners bulge outward, and side portions 833 corresponding to the four sides of a quadrangular shape. As shown in FIGS. 8B and 8C, the blocking member 830 has an external shape that is substantially trapezoidal in side view.

The top part 832 is formed in an edgeless curved shape. That is, the outer peripheral shape of the blocking member 830 is such that the four corners of a quadrangular shape bulge outward and are connected by gentle curves.

The blocking member 830 has a pressing face 834 that is pressed against the fixed frame 530, and an outer peripheral part 835 that is fixed to the metal plate 810.

The blocking member 830 is also such that the angle of the outer peripheral part 835 with respect to the pressing face 834 differs between the top part 832 and the side portions 833. More specifically, if we let $\alpha$ be the angle of the outer peripheral part 835 with respect to the pressing face 834 at the side portions 833, and $\beta$ be the angle of the outer peripheral part 835 with respect to the pressing face 834 at the top part 832, then $\alpha$ and $\beta$ are designed to satisfy the following relational formula (1).

$$\tan \alpha > \sqrt{2} \times \tan \beta \qquad (1)$$

For example, the shape of the blocking member 830 is such that a square, planar sheet-like member is cut at a specific height from the initial plane in a state in which the four sides have been bent at a specific angle so that there are no wrinkles in the four corners.

As shown in FIGS. 9A and 9B, the imaging element 800 is fixed to the metal plate 810, and is fixed so as to sandwich the blocking member 830 between the metal plate 810 and the fixed frame 530.

Consequently, the blocking member 830 blocks off the gap between the metal plate 810 and the lens 531 supported by the fixed frame 530. More precisely, the blocking member 830 blocks off the gap between the imaging element 800 and the fixed frame 530 by pressing the pressing face 834 against the lens 531.

Here, the lens barrel 1 is such that the imaging element 800 is intentionally fixed at a slight angle to the optical axis X in the manufacturing process. The reason for this is that the inclination of the imaging element 800 can be adjusted so as to absorb error in each lens group, etc., and allow the maximum resolution to be obtained consistently. When the inclination of the imaging element 800 is adjusted, the gap between the metal plate 810 and the fixed frame 530 and the gap between the metal plate 810 and the lens 531 varies with the inclination of the imaging element 800.

Therefore, to block off the gap between the imaging element 800 and the fixed frame 530 so that no foreign matter can get in between the imaging element 800 and the lens 531, the blocking member 830 needs to deform according to the change in size of the gap.

Because the blocking member 830 in this embodiment has the above shape, expansion and contraction of the blocking member 830 itself is suppressed. Therefore, it can conform to the gap merely by deforming. Consequently, the metal plate 810 and the fixed frame 530 will fit together more snugly, and dirt, dust, and other such foreign matter can be more effectively prevented from getting inside.

The outer peripheral shape of the blocking member 830 will now be described by comparison with a simple rectangular shape.

If the blocking member has a simple rectangular shape, then when the gap is small between the metal plate 810 and the fixed frame 530, twisting or bending will occur unless the blocking member expands and contracts around its four corners. That is, the blocking member 830 ends up being wrinkled.

Also, a satisfactory effect will not be obtained by merely giving the blocking member 830 an outer peripheral shape in which the four corners of a square shape bulge outward and are connected by gentle curves.

If the angles α and β of the outer peripheral part 835 with respect to the pressing face 834 are designed to satisfy the following relational formula (2), for example, the blocking member 830 will end up being wrinkled, just as with a simple rectangular shape.

$$\tan \alpha = \sqrt{2} \times \tan \beta \quad (2)$$

In this case, the shape is a simple truncated square pyramid, and if the gap between the metal plate 810 and the fixed frame 530 is small, twisting or bending will occur unless the blocking member expands and contracts around its four corners. Therefore, the blocking member 830 must be designed so that the angle of the outer peripheral part 835 with respect to the pressing face 834 satisfies the following Relational Formula I (as given above).

$$\tan \alpha > \sqrt{2} \times \tan \beta \quad (1)$$

Consequently, if the shape is such that the four corners of a square shape bulge outward and are connected by gentle curves as in this embodiment, then even if the gap between the metal plate 810 and the fixed frame 530 is small, the blocking member 830 will be able to conform to the gap merely by deforming, hardly expanding or contracting at all. As a result, the blocking member 830 will be less prone to wrinkling, the metal plate 810 and the fixed frame 530 will fit together more snugly, and dirt, dust, and other such foreign matter can be effectively prevented from getting inside.

With the technology disclosed herein, the material of the blocking member 830 need not be one that readily expands and contracts, such as rubber. Instead, the material of the blocking member 830 may be one that does not readily expand or contract, but readily deforms.

For example, a thin sheet of plastic, a thin sheet of metal, or the like can be formed by stamping or the like. Since these are thinner and easier to mold than rubber, even narrower gaps can be blocked off. Also, a thin sheet of plastic, a thin sheet of metal, or the like can be easily given functions such as electrical conductivity, anti-reflection, and so forth. Therefore, these can serve not only for blocking, but also for the removal of static electricity, cutting out unwanted light rays, and other such functions.

6. Conclusion

Configuration 1

The lens barrel 1 pertaining to this embodiment comprises the fixed frame 530, the movable frame 510, the shutter actuator 430 having first and second magnetic poles (an example of an actuator), and the image blurring correction device 500 that is provided near the shutter actuator 430. The image blurring correction device 500 has the hall element 524 (an example of a magnetic sensor) for detecting the relative position of the movable frame 510 with respect to the fixed frame 530, the magnet 515 that is disposed between the shutter actuator 430 and the hall element 524 at a position opposite the hall element 524, and the shield plate 514 that is provided between the shutter actuator 430 and the magnet 515. The shield plate 514 includes the main body 514a opposite the magnet 515, and the protrusion 514b that protrudes from the main body 514a. The main body 514a is provided at a position through which pass the lines of magnetic force generated from the first magnetic pole, out of the lines of magnetic force produced from the shutter actuator 430 by driving the shutter actuator 430. The protrusion 514b is provided at a position through which pass the lines of magnetic force generated from the second magnetic pole, out of the lines of magnetic force produced from the shutter actuator 430.

With Configuration 1, even when a plurality of actuators are disposed close together, it will be less likely that magnetic flux leakage generated by the first actuator will affect the second actuators.

The technology disclosed herein can be applied to any device having a camera function, such as a camera, a portable telephone equipped with a camera, or a portable terminal equipped with a camera.

GENERAL INTERPRETATION OF TERMS

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A lens barrel, comprising:
a fixed frame;
a movable frame configured to move relative to the fixed frame;
an actuator having a first magnetic pole and a second magnetic pole; and
an image blurring correction device having a magnetic sensor disposed near the actuator and configured to detect the position of the movable frame, a magnet that is disposed between the actuator and the magnetic sensor at a position that is juxtaposed to the magnetic sensor, a shield plate having a main body that is provided between the actuator and the magnet and is disposed at a position that is juxtaposed to the magnet and a protrusion that protrudes from the main body,
wherein the main body is provided at a position through which pass lines of magnetic force generated from the first magnetic pole of the actuator when the actuator is driven, and
the protrusion is provided at a position through which pass lines of magnetic force generated from the second magnetic pole of the actuator.

2. The lens barrel according to claim 1,
wherein the protrusion has a magnetic flux absorption portion that absorbs the magnetic flux generated from the second magnetic pole, and a linking portion that links the magnetic flux absorption portion and the main body.

3. The lens barrel according to claim 1,
wherein the protrusion is mounted to the movable frame via an adhesive agent.

4. The lens barrel according to claim 3,
wherein the magnet is attracted to the shield plate by magnetic force, and is fixed to the movable frame via the shield plate.

5. The lens barrel according to claim 1,
wherein the actuator is a shutter actuator.

6. The lens barrel according to claim 2,
wherein the protrusion is mounted to the movable frame via an adhesive agent.

7. The lens barrel according to claim 6,
wherein the magnet is attracted to the shield plate by magnetic force, and is fixed to the movable frame via the shield plate.

8. The lens barrel according to claim 2,
wherein the actuator is a shutter actuator.

9. The lens barrel according to claim 3,
wherein the actuator is a shutter actuator.

10. The lens barrel according to claim 4,
wherein the actuator is a shutter actuator.

11. A lens barrel, comprising:
a fixed frame;
a movable frame configured to move relative to the fixed frame;
an actuator having a first magnetic pole and a second magnetic pole; and
an image blurring correction mechanism having a magnetic sensor disposed near the actuator and configured to detect the position of the movable frame, a magnet that is disposed between the actuator and the magnetic sensor at a position that is juxtaposed to the magnetic sensor, a shield plate having a main body that is provided between the actuator and the magnet and is disposed at a position that is juxtaposed to the magnet and a protrusion that protrudes from the main body,
wherein the main body is provided at a position through which pass lines of magnetic force generated from the first magnetic pole of the actuator when the actuator is driven,
the protrusion is provided at a position through which pass lines of magnetic force generated from the second magnetic pole of the actuator, and
the actuator is configured to actuate a mechanism other than the image blurring correction mechanism.

12. The lens barrel according to claim 1,
wherein the shield plate is a magnetic shield plate.

13. The lens barrel according to claim 11,
wherein the shield plate is a magnetic shield plate.

14. A lens barrel, comprising:
a fixed frame;
a movable frame configured to move relative to the fixed frame;
an actuator having a first magnetic pole and a second magnetic pole; and
an image blurring correction mechanism having a magnetic sensor disposed near the actuator and configured to detect the position of the movable frame, a magnet that is disposed between the actuator and the magnetic sensor at a position that is juxtaposed to the magnetic sensor, a magnetic shield plate that is provided between the actuator and the magnet and at a position through which pass lines of magnetic force produced from the actuator when the actuator is driven, wherein
the actuator is configured to actuate a mechanism other than the image blurring correction mechanism.

15. The lens barrel according to claim 14,
wherein the shield plate includes a protrusion that has a magnetic flux absorption portion that absorbs the magnetic flux generated from the second magnetic pole, and a linking portion that links the magnetic flux absorption portion and a main body of the shield plate.

16. The lens barrel according to claim 14,
wherein the magnet is attracted to the shield plate by magnetic force, and is fixed to the movable frame via the shield plate.

17. The lens barrel according to claim 14,
wherein the actuator is a shutter actuator.

18. The lens barrel according to claim 15, wherein the actuator is a shutter actuator.

19. The lens barrel according to claim 16, wherein the actuator is a shutter actuator.

\* \* \* \* \*